(12) United States Patent
Swamy

(10) Patent No.: US 8,737,097 B1
(45) Date of Patent: May 27, 2014

(54) ELECTRONICALLY ISOLATED METHOD FOR AN AUTO TRANSFORMER 12-PULSE RECTIFICATION SCHEME SUITABLE FOR USE WITH VARIABLE FREQUENCY DRIVES

(71) Applicant: Yaskawa America, Inc., Waukegan, IL (US)

(72) Inventor: Mahesh M. Swamy, Gurnee, IL (US)

(73) Assignee: Yaskawa America, Inc., Waukegan, IL (US)

( * ) Notice: Subject to any disclaimer, the term of this patent is extended or adjusted under 35 U.S.C. 154(b) by 0 days.

(21) Appl. No.: 13/688,910

(22) Filed: Nov. 29, 2012

(51) Int. Cl.
  *H02M 7/00* (2006.01)

(52) U.S. Cl.
  USPC .......................................................... 363/67

(58) Field of Classification Search
  USPC .................................. 363/65, 67, 69, 125, 126
  See application file for complete search history.

(56) References Cited

U.S. PATENT DOCUMENTS

| | | | |
|---|---|---|---|
| 4,255,784 A | | 3/1981 | Rosa |
| 4,866,591 A | * | 9/1989 | Cook et al. .................... 363/67 |
| 5,455,759 A | | 10/1995 | Paice |
| 5,461,297 A | * | 10/1995 | Crawford .................... 320/166 |
| 5,619,407 A | | 4/1997 | Hammond |
| 5,894,414 A | * | 4/1999 | Jiang .............................. 363/65 |
| 6,191,968 B1 | | 2/2001 | Paice |
| 6,239,999 B1 | * | 5/2001 | Mai .............................. 363/125 |
| 6,249,443 B1 | | 6/2001 | Zhou et al. |
| 6,335,872 B1 | | 1/2002 | Zhou et al. |
| 6,396,723 B2 | | 5/2002 | Mochikawa et al. |
| 6,525,951 B1 | | 2/2003 | Paice |
| 7,170,760 B2 | * | 1/2007 | Hsieh et al. .................... 363/16 |
| 7,274,280 B1 | | 9/2007 | Paice |
| 7,710,751 B2 | * | 5/2010 | Nishino ........................ 363/67 |
| 2002/0186112 A1 | | 12/2002 | Kamath |
| 2003/0090916 A1 | * | 5/2003 | Thrap ............................ 363/67 |
| 2005/0135126 A1 | * | 6/2005 | Gazel et al. .................... 363/67 |

FOREIGN PATENT DOCUMENTS

JP  3591548  9/2004

OTHER PUBLICATIONS

G. R. Kamath, D. Benson, and R. Wood, "A Compact Autotransformer based 12-Pulse Rectifier Circuit", in IECON 2001, pp. 1344-1349.
G. R. Kamath, D. Benson, and R. Wood, "A Novel Autotransformer based 18-Pulse Rectifier Circuit", in Applied Power Electronics Conference and Exposition, 2002.

* cited by examiner

*Primary Examiner* — Adolf Berhane
(74) *Attorney, Agent, or Firm* — Wood, Phillips, Katz, Clark & Mortimer

(57) ABSTRACT

An AC/DC converter system comprises an input circuit for connection to a 3-phase AC source. An autotransformer is coupled to the input circuit for developing first and second phase shifted AC supplies. A first AC/DC converter has a first rectifier connected to the first phase shifted AC supply converting AC power to DC power across a first DC bus having a first DC bus capacitor. A second AC/DC converter has a second rectifier connected to the second phase shifted AC supply converting AC power to DC power across a second DC bus having a second DC bus capacitor. First and second sets of switches are connected between the respective first and second DC buses and a main DC bus having a main DC bus capacitor. The first and second sets of switches are controlled so that only one of the first and the second DC buses is connected to the main DC bus to charge the main DC bus capacitor.

20 Claims, 6 Drawing Sheets

ELECTRONICALLY ISOLATED METHOD FOR AN AUTO TRANSFORMER 12-PULSE RECTIFICATION SCHEME SUITABLE FOR USE WITH VARIABLE FREQUENCY DRIVES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to an AC/DC converter system and, more particularly, to an electrically isolated method for an autotransformer based 12-pulse rectification scheme.

BACKGROUND

Harmonic distortion concerns are serious when the power rating of a variable frequency drive (VFD) load increases. Large power VFDs are gaining in popularity due to their low cost and impressive reliability. In many large power installations, current harmonic distortion levels achievable using traditional 12-pulse techniques are insufficient to meet the levels recommended in IEEE 519 (1992). In view of this, active techniques have been proposed that achieve much superior harmonic performance. However, these schemes are expensive and can create unwanted EMI.

In general, the characteristic harmonics generated by a semiconductor rectifier is given by:

$$h = kq \pm 1 \tag{1}$$

where, h is the order of harmonics; k is any integer, and q is the pulse number of the rectifier (six for a 6-pulse rectifier). The per unit value of the characteristic harmonics present in the theoretical current waveform (assuming a rectangular current waveform spanning 120 electrical degrees) at the input of the semiconductor rectifier is given by 1/h. In practice, the observed per unit value of the harmonics is greater than 1/h. From equation (1), it is clear that increasing the pulse number from 6 to either 12 or 18 will reduce the amplitude of low order harmonics and hence the total current harmonic distortion.

For 12-pulse operation, there is a need for two sets of 3 phase AC supply that are phase shifted with respect to each other by 30 electrical degrees. Traditionally, this is achieved using a three winding isolation transformer that has one set of primary windings and two sets of secondary windings. One set of secondary winding is in phase with the primary winding, while the other set is phase shifted by + or −30 electrical degrees with the primary. This arrangement yields two phase-shifted supplies that allow 12-pulse operation as shown in FIG. 1. The main disadvantage of the scheme shown in FIG. 1 is that the isolation transformer is large in size, heavy and costly.

On re-examining the circuit of FIG. 1, it can be noted that one set of windings does not have any phase shift with respect to the primary windings. This is important because it allows one six-pulse rectifier circuit to be directly connected to the AC source via a balancing inductance and the other six-pulse rectifier via a half power rated isolation transformer. The inductance of the balancing inductor is matched to the leakage inductance of the half-power isolation transformer to assure good current balance to achieve 12-pulse operation.

The 12-pulse arrangement described above has been referred to as a hybrid 12-pulse configuration and is shown in FIG. 2. The phase shifting transformer feeding one of the two six-pulse rectifiers is sized to handle half the rated power [Tsuneo Kume, "Multi-Pulse Rectifier Circuit", Japanese Patent P3591548, Sep. 3, 2004]. Similarly, the matching inductor is sized to carry only half the rated current. This arrangement results in the overall size of the transformer and matching inductor combination to be smaller and less expensive than the three winding arrangement.

Among advantages of the hybrid 12-pulse scheme are that size and cost of the hybrid 12-pulse configuration is much less than the 3-winding arrangement. 12-pulse operation is achieved with low total current harmonic distortion, typically less than 10% THD at rated load condition. Unlike the 3-winding method, in this method the current (instead of flux in the core) in the two bridges are combined at the source to cancel the low order harmonics. Leakage flux and winding mismatch problems do not occur.

However, the scheme shown in FIG. 2 still has some drawbacks. The impedance mismatch between the leakage inductance and the external matching inductance can never be accomplished for all operating conditions because the leakage inductance is a function of current through the transformer while the external inductance is in the form of self inductance, which is constant until its rated current value. In order to achieve THD levels of less than 8%, an input AC line inductor may need to be used. The arrangement of FIG. 2 cannot be used where voltage level translation is needed.

The phase shift necessary to achieve multi-pulse operation can also be achieved by using autotransformers. Autotransformers do not provide any isolation between the input and output but can be used to provide phase shift. Autotransformers are typically smaller compared to regular isolation transformers because they do not need to process all of the power. The majority of the load current passes directly from the primary to the secondary terminals and only a small amount of VA is necessary for the phase-shift processed by the autotransformer. This makes them small, inexpensive, and attractive for use in multi-pulse systems.

The autotransformer technique can be broadly classified into three distinct groups. The first is the traditional group that aims at providing the needed +/− 15 degree or 30 degree phase shift using either fork or polygon type autotransformers. The second group consists of employing autotransformers to convert the input 3-phase supply to a balanced 6-phase output, bearing a 60 degree phase difference among the six outputs. The last group consists of utilizing autotransformers to provide the missing parts of the typical discontinuous waveform seen in 6-pulse rectifiers, resulting in a topology that can be said to consist of asymmetrical rated diode rectifier bridges. A sample representative for each of the three groups of autotransformers used in multi-pulse application is discussed next.

For a +/−15 degree Phase Shift Autotransformer, when parallel rectifiers are used as in multi-pulse techniques, it is important to maintain sharing of current among the multi-pulse rectifiers. If current sharing is compromised, then the amplitudes of lower order harmonics between the two rectifiers in a 12-pulse scheme will not cancel completely and this will result in poor harmonic performance. By electrically isolating one rectifier from the other either by using three-winding isolation transformer or by using half-power isolation transformer, in the two schemes discussed earlier, acceptable 12-pulse performance was possible. However, when autotransformers are employed, such isolation is lost and current from one set of phase-shifted windings can flow into the other set, thereby compromising the equal distribution of current between the phase shifted sets of windings. One way to force the rectifiers to share correctly is to introduce an inter-phase transformer (IPT) in between the outputs of the two diode-rectifier units as shown in FIG. 3. Zero-sequence blocking transformers (ZSBT) in between the rectifiers and the phase shifted outputs of the autotransformer are needed to reduce non-characteristics triplen harmonics from flowing into the AC system. The autotransformer of FIG. 3 has phase shifted outputs of ±15°. The addition of IPT and ZSBT helps in reducing non-characteristics low order harmonics from flowing into the AC system but adds to cost and size of the total system.

A 3-phase to 6-phase Fork-type Autotransformer is shown in U.S. Pat. No. 4,255,784. In this patent, the voltage imbalance with many autotransformer base topologies is overcome by adopting a 3-phase to 6-phase converter that yields a balanced 6-phase output that has the phases phase shifted by 60 electrical degrees between each other. By doing this, the voltage imbalance issue is resolved thereby not requiring the use of IPT and ZSBT.

The voltage imbalance problem associated with many autotransformer schemes can also be overcome by adopting a 3-phase to 9-phase converter that yields a balanced 9-phase output that has the phases phase shifted by 40 electrical degrees between each other. By doing this, the voltage imbalance issue is resolved thereby not requiring the use for IPT and ZSBT. One such scheme has been proposed in U.S. Pat. No. 5,455,759, which results in 18 pulse operation.

However, the 9-phase output has a few drawbacks. The rectified output voltage from a balanced 9-phase output is about 1.14 times higher (14% higher) than that obtained from a 3-phase 6-pulse AC to DC rectifier. This requires modifying the basic 3-phase to 9-phase converter using more windings and alternate paths to provide the needed step down action necessary to use the resulting topology on an existing 3-phase AC to DC rectifier system. Many topological modifications including the one in the '759 patent have been described in patents to overcome this issue, including U.S. Pat. Nos. 5,619,407; 6,249,443; 6,335,872; 6,191,968 and 6,525,951. However, the extra stub and teaser windings add cost and complexity to the structure.

The second important issue observed in all 3-phase to 9-phase autotransformer schemes is the sudden change in current from one conducting pair to the other every 40 electrical degrees. The situation is amplified since most autotransformers do not have enough leakage inductance to slow the transition resulting in high di/dt across the rectifier diodes. This situation has been studied and statistical records have shown that standard rectifier grade diodes are vulnerable to premature failure. The sudden change in current also reflects on the input lines, making the current have sharp edges with quick transitions. Such abnormalities deteriorate the harmonic performance and so there is inherently a need to add large inductance to smoothen the current waveform. In such topologies, the input inductor can be as high as 0.075 pu, see the '968 and '951 patents.

For 3-phase to 9-phase Polygon type Autotransformers applications, many autotransformers employ either delta fork or wye fork type of windings. Such autotransformer configurations use stub and/or teaser windings resulting in a structure where the overall size and rating of the autotransformer is higher than the optimal value. Use of stub windings typically results in poor utilization of the core and involves more labor to wind the coils.

Polygon type autotransformers are preferred over stub type autotransformer from size and core utilization points of view. Such an autotransformer has been put forward in U.S. Pat. Nos. 6,249,443 and 6,335,872. The kVA rating of the 3-phase to 9-phase autotransformer for 18-pulse operation proposed in the latter is reported to be only 34% of the rating of a standard 4-winding isolation transformer. However, in the schemes presented in these patents, the problem of low inductance, high di/dt of rectifier current, and winding manufacturing complications persist. In fact, in these schemes, each core is required to have five separate windings with multiple connections that need to be brought out to make appropriate connections with other phases. The labor involved and the complexity of the windings are daunting.

A more recent polygon configuration referred as the irregular polygon is given in U.S. Pat. No. 7,274,280. However, this structure also suffers from complexity in winding, has higher losses due to current flowing through more number of windings, and still needs a fairly significant input impedance to smooth the sharp edges due to the sudden change in current associated with autotransformers.

In the schemes discussed thus far, the intent was to provide equal and balanced output voltages to rectifier diodes so that current is equally shared and the total harmonic distortion is low. A different school of thought, where the missing portions, that form the discontinuity in typical 6-pulse rectification, is added to the input current waveform by employing asymmetrically sized rectifiers and autotransformers.

One such scheme has been proposed in G. R. Kamath, D. Benson, and R. Wood, "A Compact Autotransformer based 12-Pulse Rectifier Circuit", in IECON 2001, pp. 1344-1349. This scheme aims at providing asymmetrical conduction to result in 12-pulse operation. The main power is directly conducted from the mains and the autotransformer is used only to provide auxiliary current to fill the missing parts in a traditional six pulse operation.

This idea has been extended to 18-pulse operation by the authors in G. R. Kamath, D. Benson, and R. Wood, "A Novel Autotransformer based 18-pulse Rectifier Circuit", in *Applied Power Electronics Conference and Exposition"*, 2002; and U.S. Pat. No. 6,396,723. Asymmetrical conduction of the rectifiers forms the basis of these. For example, in the 12-pulse scheme, the main rectifier carries 75% of load current and the auxiliary rectifier carries the remaining 25%. Similarly in the latter article, the combined current drawn by the auxiliary rectifiers is 33% of the total load current, with the main rectifier carrying the remainder.

For retrofit applications and applications that have built-in 12-pulse or 18-pulse rectifier units of equal rating, the schemes presented above are not easily applicable, because the main diode rectifier module needs to be rated differently compared to the auxiliary rectifier modules. Further, in the tests reported on such schemes, the input inductor plays a significant role in smoothing the unbalanced current flow and improving the overall harmonic distortion.

From the discussion on autotransformers thus far, some important shortcomings of the autotransformer based topology are summarized. The leakage and magnetizing inductances of many autotransformers in the market is far lower than that in isolation transformers. Powering up an autotransformer typically results in an inrush current that is much higher than that observed in systems with isolation transformer. This requires careful fuse selection and coordination so that nuisance trips are avoided and fuse protection is still available. In all the 18-pulse autotransformer methods, the change of current from one conducting diode pair to the other is quick. Though the rms current rating may not exceed the current rating of the diode, attention should be given to the di/dt of the current through the diodes. One solution is to use additional inductors in between the autotransformer and the input rectifier to lower the di/dt. This makes the overall scheme bulky and expensive. The rectangular current through the windings also increases losses, prompting the need to use fans to keep the size of the transformer small. Due to the sudden change in current and lack of sufficient leakage inductance in autotransformers, such topologies require significant input impedance to smooth the current and reduce the overall input current distortion. All the autotransformer configurations discussed here do not operate well without a significant amount of input inductance ahead of the autotransformer. Autotransformer techniques utilize complex winding structures, either of the stub-type or the polygon type. These transformers are labor intensive to manufacture and result in poor core utilization. Even with the polygon types, the number of windings per core is large and is a labor intensive winding process. Autotransformer topologies that convert a 3-phase system to a 9-phase output create an aberration in the DC bus ripple content of a VFD. When one or two of nine output phases has a bad rectifier, the increase in DC bus ripple is hardly noticeable and this reduces the chance for detection of failure. The power flow is now shared by existing rectifiers that can eventually fail. Given the above shortcomings, it is clear that there is room for improvement in multi-pulse rectification schemes.

The present invention is directed to solving one or more of the problems discussed above in a novel and simple manner.

SUMMARY

The present invention is directed to an AC/DC converter system and, more particularly, to providing isolation when used with an autotransformer.

In accordance with one aspect of the invention, there is described an AC/DC converter system comprising an input circuit for connection to a 3-phase AC source. An autotransformer is coupled to the input circuit for developing first and second phase shifted AC supplies. A first AC/DC converter has a first rectifier connected to the first phase shifted AC supply converting AC power to DC power across a first DC bus having a first DC bus capacitor. A second AC/DC converter has a second rectifier connected to the second phase shifted AC supply converting AC power to DC power across a second DC bus having a second DC bus capacitor. First and second sets of switches are connected between the respective first and second DC buses and a main DC bus having a main DC bus capacitor. The first and second sets of switches are controlled so that only one of the first and the second DC buses is connected to the main DC bus to charge the main DC bus capacitor.

It is a feature that the first and second sets of switches are controlled by a ramp up pulse generator.

It is another feature that the ramp up pulse generator has a duty cycle less than 50%.

It is a further feature that the first and second sets of switches each comprises two pairs of a switch diode combination for the plus and minus side of the respective first and second DC bus.

It is yet another feature that the first and second sets of switches are switched at about 7.2 kHz with equal duty cycle. The duty cycle may be about 50%.

There is disclosed in accordance with another aspect of the invention an AC/DC converter system comprising an input circuit for connection to a 3-phase AC source. An autotransformer is coupled to the input circuit for developing first and second phase shifted AC supplies. A first AC/DC converter has a first rectifier connected to the first phase shifted AC supply converting AC power to DC power across a first DC bus having a first DC bus capacitor. A second AC/DC converter has a second rectifier connected to the second phase shifted AC supply converting AC power to DC power across a second DC bus having a second DC bus capacitor. A control circuit is connected between the first and second DC buses and a main DC bus having a main DC bus capacitor. The control circuit alternately charges the main DC bus capacitor from the 2-phase shifted AC supplies. The rectified outputs of the 2-phase shifted AC supplies are electrically isolated from one another.

It is another feature of the invention to further provide an inverter coupled to the main DC bus to convert DC power to AC power to define a variable frequency drive system.

Other features and advantages will be apparent from a review of the entire specification, including the appended claims and drawings.

DETAILED DESCRIPTION

Diode rectifiers with large DC bus capacitors, used in the front ends of Variable Frequency Drives (VFDs) draw discontinuous current from the power system resulting in current distortion and hence voltage distortion. Typically, the power system can handle current distortion without showing signs of voltage saturation. However, when the majority of the load on a distribution feeder is made up of VFDs, current distortion becomes an important issue since it can cause voltage distortion. Multi-pulse techniques to reduce input current harmonics are popular because they do not interfere with the existing power system either from higher conducted EMI when active techniques are used or from possible resonance, when capacitor based filters are employed.

Traditional 12-pulse and 18-pulse techniques involve large and bulky phase shifting transformers that are expensive and occupy space. Autotransformer techniques typically require addition of expensive zero sequence blocking transformers and inter-phase transformers that make the overall system bulky and expensive. A 12-pulse topology is described herein that employs a traditional autotransformer but employs a semiconductor based switching scheme to achieve isolation between the two rectifiers resulting in true 12-pulse operation with reduced harmonic current at the input. It is also seen to be smaller in size and weight, and lower in cost compared to an isolation transformer or other phase shifting schemes presently available.

The concern with the prior art topologies discussed above is current sharing. Many researchers have proposed only passive techniques to address the problem of current sharing among multiple rectifiers. The disclosed idea is a major departure from passive techniques, both symmetrical and asymmetrical methods proposed thus far. An active method of isolating the outputs of a standard autotransformer is disclosed here.

Figure 1:
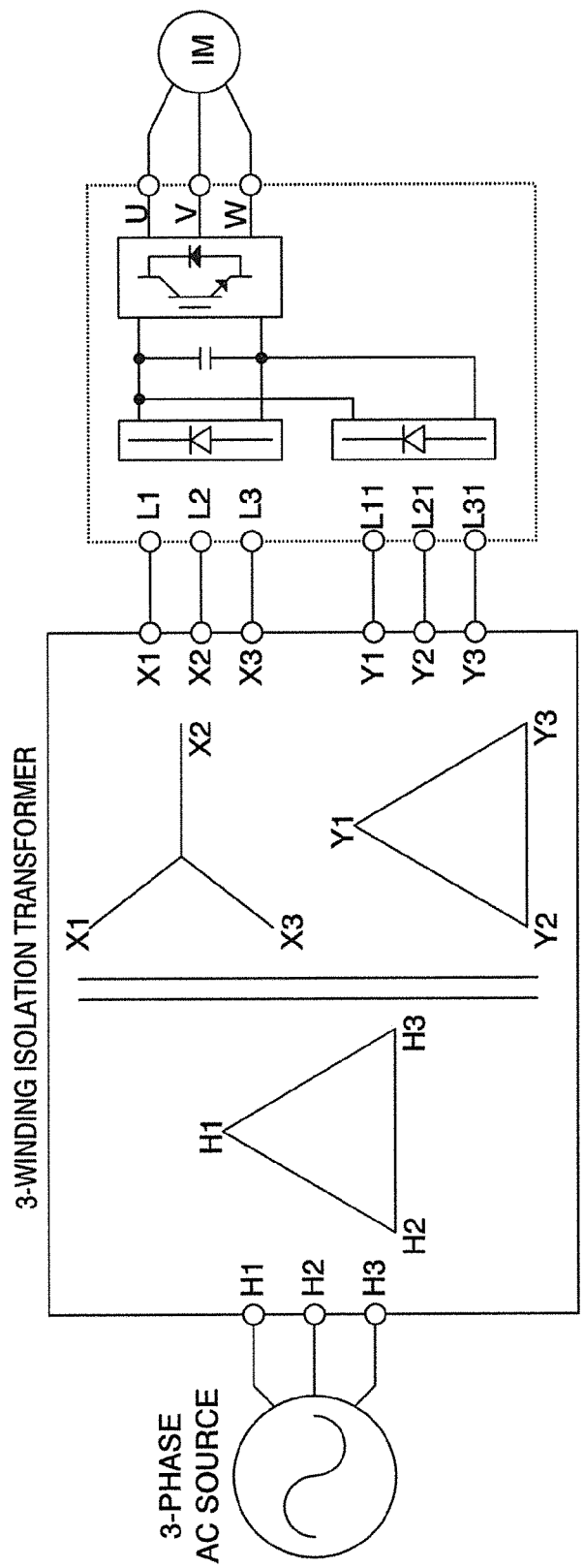
FIGS. 1-3 comprise schematic representations of prior art variable frequency drive systems.
Figure 2:
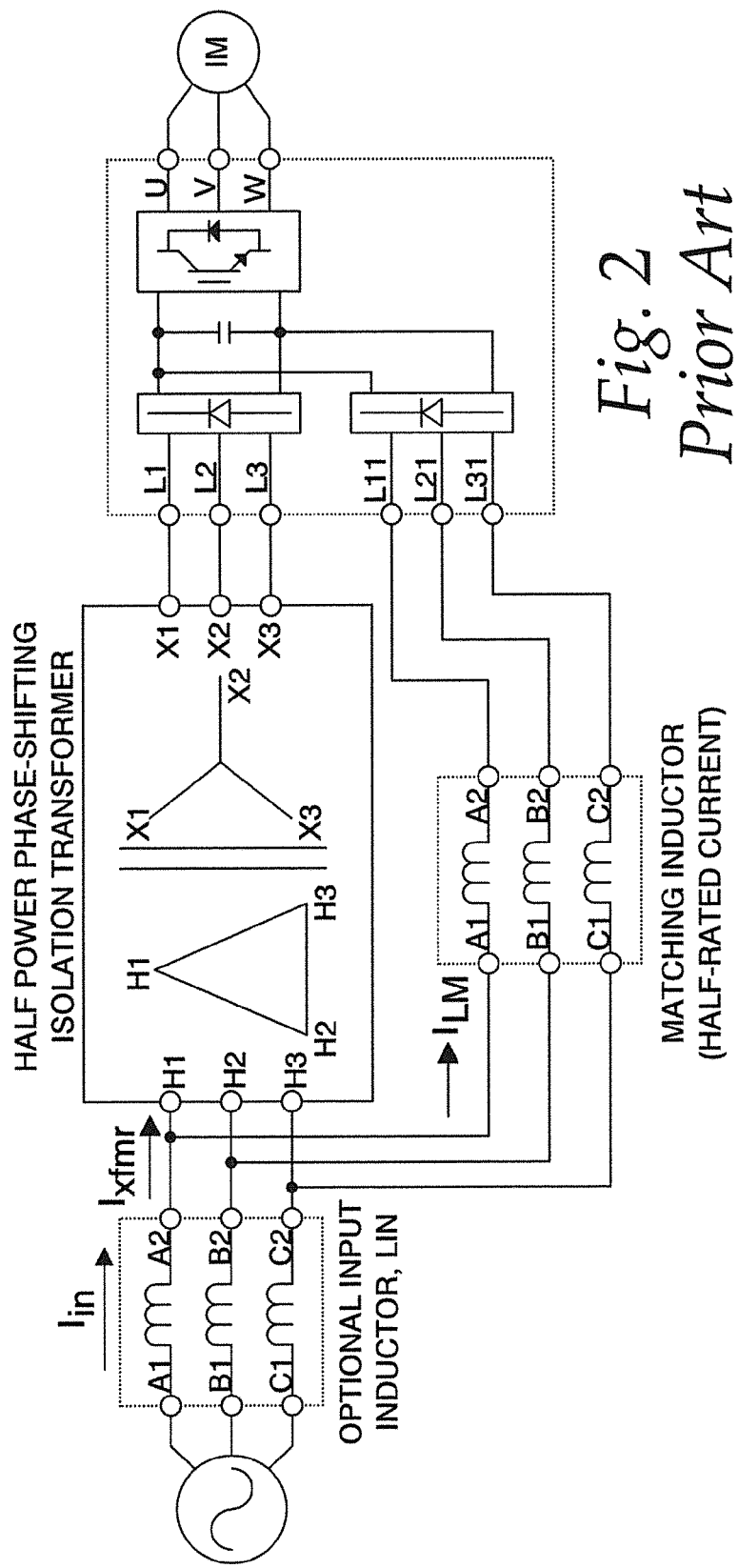
Figure 3:
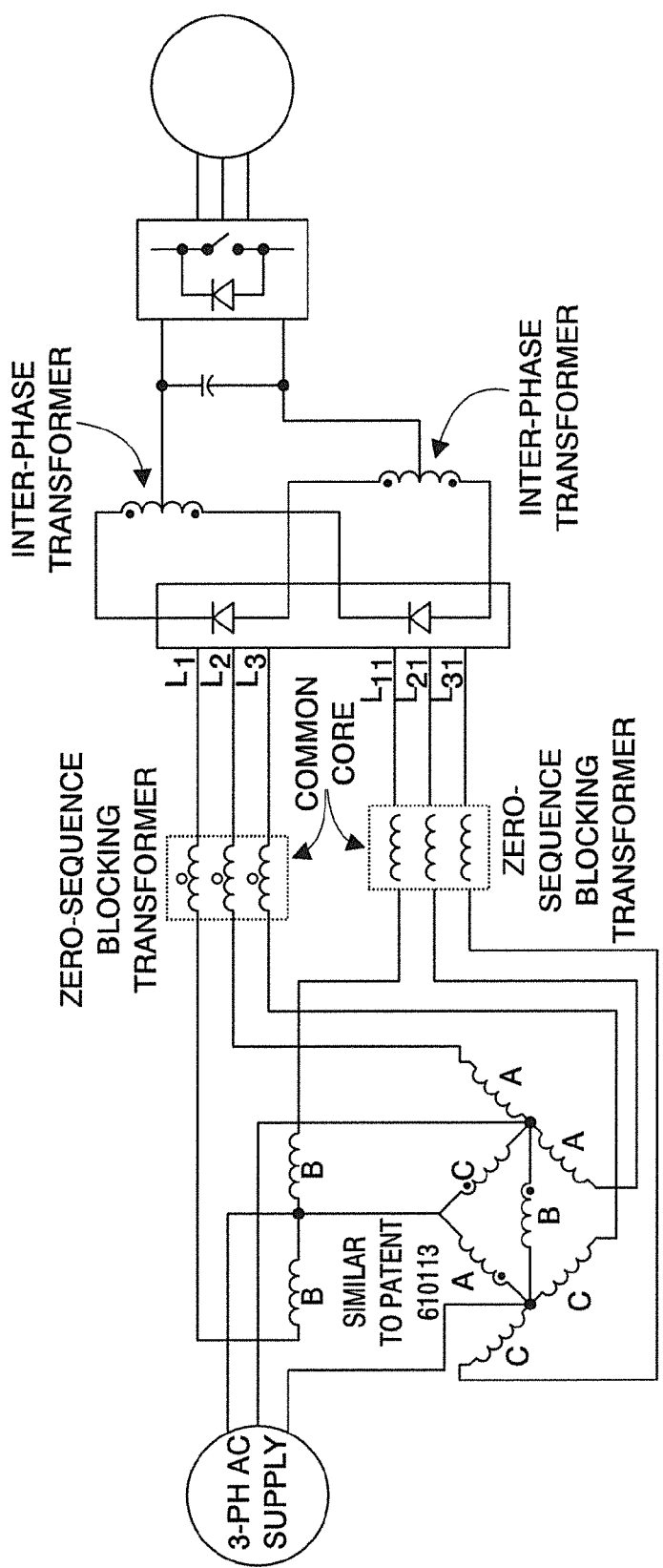
Figure 4:
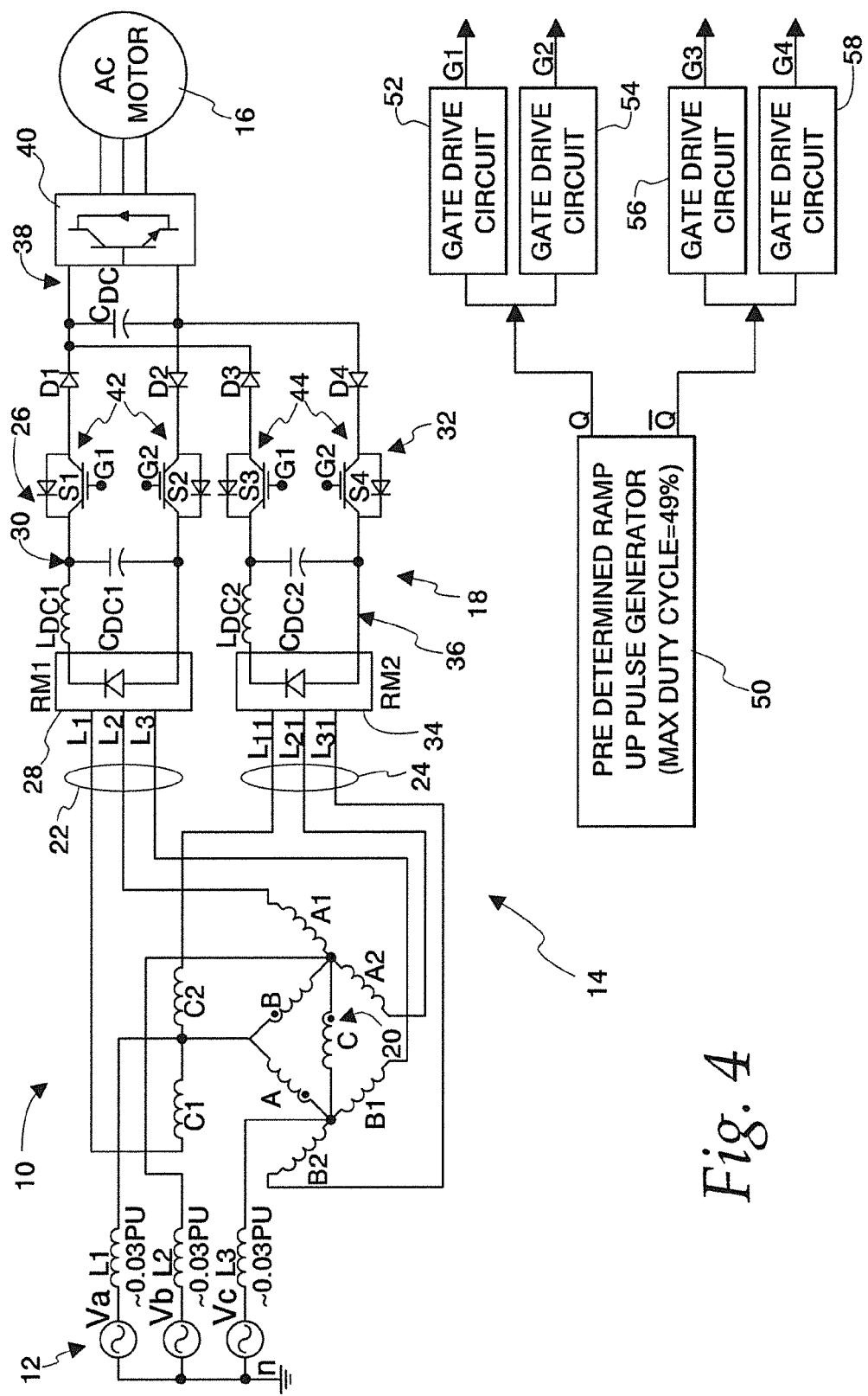
FIG. 4 is a schematic representation of a variable frequency drive in accordance with the invention.

Referring to FIG. 4, a motor drive system 10 is illustrated. The motor drive system 10 receives power from an AC source 12 and includes a variable frequency drive (VFD) 14 for driving an induction motor 16. As is known, a control unit (not shown) would be used for controlling the VFD 14. Such a control unit is not shown herein as it does not itself form part of the invention, other than as particularly described below. Instead, the invention is particularly directed to an AC/DC converter system 18, as described below.

The AC source 12 may comprise a drive or the like developing 3-phase AC power which is connected via inductors L1, L2 and L3 to an autotransformer 20. The autotransformer 20 is wired as a delta transformer with the main windings identified as A, B and C. Two sets of secondaries are taken off and labeled as A1, B1 and C1, and A2, B2 and C2, and comprising first and second phase shifted AC supplies. Particularly, the first phase shifted AC supply is provided at 22 labeled as conductors $L_1$, $L_2$ and $L_3$. The second phase shifted AC supply is labeled at 24 and is presented by conductors $L_{11}$, $L_{21}$ and $L_{31}$. A first AC/DC converter 26 has a first rectifier module 28 connected to the first phase shifted AC supply 22 converting AC to DC power across a first DC bus 30 having a first DC bus capacitor $C_{DC1}$. A second AC/DC converter 32 has a second rectifier module 34 connected to the second phase shifted AC supply 24 converting AC to DC power across a second DC bus 36 having a second DC bus capacitor $C_{DC2}$.

The AC/DC converter system 18 further comprises a main DC bus 38, also referred to as an inverter DC bus, having a main DC bus capacitor $C_{DC}$. The main DC bus 38 is connected to an inverter 40. The main DC bus 38 provides a relatively fixed DC voltage, as described below, for the inverter 40. The inverter 40 converts DC power to AC power to drive the motor 16.

In accordance with the invention, a first set of switches 42 is connected between the first DC bus 30 and the main DC bus 38. A second set of switches 44 is connected between the second DC bus 36 and the main DC bus 38. The first set of switches 42 and second set of switches 44 are controlled so that only one of the first DC bus 30 and the second DC bus 36 is connected to the main DC bus 38 to charge the main DC bus capacitor $C_{DC}$.

The first set of switches 42 comprises a first switch diode combination S1 and D1 connected in series between the plus side of the first DC bus 30 and the plus side of the main DC bus 38; and a second switch diode combination S2 and D2 connected in series between the minus side of the first DC bus 30 and the minus side of the main DC bus 38. Similarly, the second set of switches 44 comprises a third switch diode combination S3 and D3 connected in series between the plus side of the second DC bus 36 and the plus side of the main DC bus 38; and a fourth switch diode S4 and D4 connected in series between the minus side of the second DC bus 36 and the minus side of the main DC bus 38.

A ramp up pulse generator 50 is used for controlling operation of the switches S1-S4. The ramp up pulse generator 50 has a non-inverted output Q and an inverted output $\overline{Q}$. The non-inverted output Q operates a first gate drive circuit 152 which provides a gate signal G1 to gates the first switch S1 and a second gate drive circuit 54 providing a gate signal G2 to the second switch S2. The inverted output $\overline{Q}$ operates a third gate drive circuit 56 that develops a drive signal G3 for the third switch S3 and a fourth gate drive circuit 58 that develops a gate signal G4 for the fourth switch S4. The duty cycle for each set of switches 42 and 44 is about 50% and is set to a maximum of about 49% to avoid overlap.

The disclosed circuit is unique in the way it accomplishes isolation between the two sets of phase shifted windings of the autotransformer 20 shown in FIG. 4. The main DC bus capacitor $C_{DC}$ is charged alternately from two phase shifted AC sources 22 and 24, the rectified outputs of which are electrically isolated from each other. The electrical isolation as shown in FIG. 4 is achieved by two pairs 42 and 44 of switch-diode combination. To keep current in the windings of the autotransformer continuous, external DC bus capacitors $C_{DC1}$ and $C_{DC2}$ are employed.

The main or inverter DC bus 38 is charged from either one of the DC bus capacitors $C_{DC1}$ or $C_{DC2}$, depending on which set 42 or 44 of switches are on. The two sets 42 and 44 of switch-diode pair operate in a complimentary fashion, as shown in the associated timing diagram of FIG. 6. When the first pair 42 of switch-diode combination marked S1-D1 and S2-D2 are ON (gate signals G1 and G2 are high), the complementary pair 44 of switch-diode marked S3-D3, and S4-D4 are OFF (gate signals G3 and G4 are low). Similarly, when the second pair 44 of switch-diode combination marked S3-D3 and S4-D4 are ON (gate signals G3 and G4 are high), the complementary first pair 42 of switch-diode marked S1-D1, and S2-D2 are OFF (gate signals G1 and G2 are low). Hence, at any given time either $C_{DC1}$ corresponding to S1-D1 and S2-D2 is connected across the inverter DC bus 38, or $C_{DC2}$ corresponding to S3-D3 and S4-D4 is connected across the inverter DC bus 38. The reason for the diodes D1-D4 in series with the respective switches S1-S4 is the fact that most switches S1-S4 have body diodes or external diodes present across their collector and emitter terminals in the opposite or free-wheeling direction, which can provide unwanted conduction of current from one rectifier section to the other. This will be counter-productive to the desire to achieve electrical isolation between the two rectifiers 28 and 34.

To reduce the influence of wiring inductance between switch-diode pairs and the main DC bus capacitance $C_{DC}$ of the inverter section, a snubber capacitor is employed right on the inverter module 40. The wiring in between the switches (S1-S4) and the inverter module 40 is desired to be a laminated bus structure to reduce inductance. Switches S1-S2 and S3-S4 are operated at 7.2 kHz with equal duty ratio of about 0.5 to optimize the rating of the switches. Also, this allows balanced current flow from each three phase set of the autotransformer 20 thereby reducing the input current THD. The voltage across the switches S1-S4 is the instantaneous difference between the voltages across $C_{DC1}$ or $C_{DC2}$ and $C_{DC}$ since the set of the switches that are OFF has the voltage of either $C_{DC1}$ or $C_{DC2}$ at one side of the switch and $C_{DC}$ on the other side of the switch. Hence, the voltage rating of the switches S1-S4 need not be that of the full DC bus voltage of the VFD.

The salient features of the proposed topology are as follows: The autotransformer 20 is typically rated to 0.33 pu of the drive rating. An additional input inductor in the 0.03 pu range helps further smooth the input current. The switches S1-S2 and S3-S4 carry half the rated DC bus current of the drive 10 but should be capable of handling the rated peak currents. The voltage rating of the switches S1-S4 can be optimally selected since full voltage is not applied across the switches S1-S4. Switching the switches at 7.2 kHz or higher precludes the need for a synchronizing signal from the source. The topology lends itself to accept built-in DC link chokes in both positive and negative buses. Soft charging of the main DC bus capacitor $C_{DC}$ can be accomplished as will be explained later.

Figure 5A:
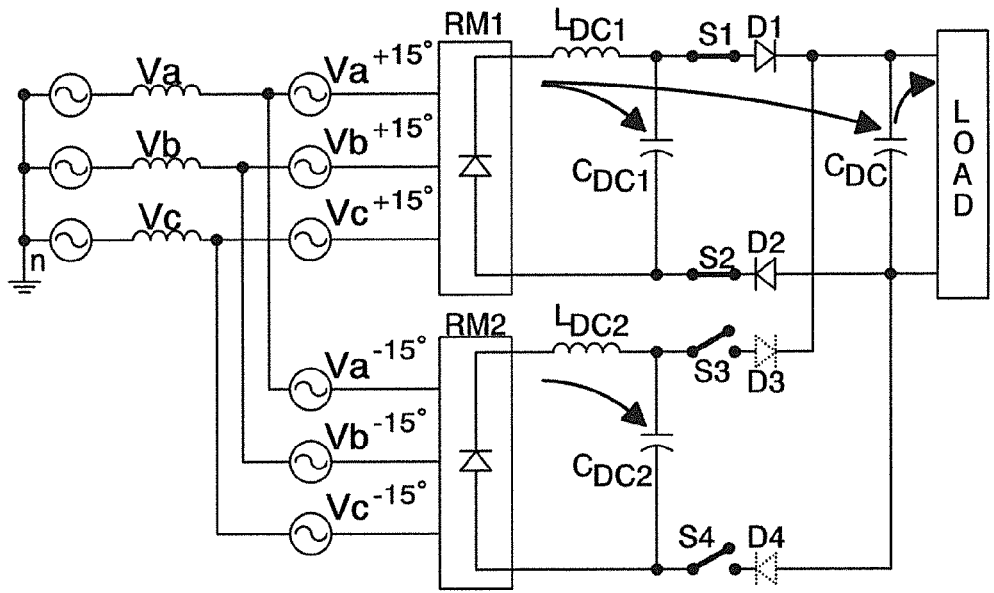
FIGS. 5A and 5B illustrate equivalent circuits for the schematic of FIG. 4 according to which of a set of switches is conducting.
Figure 5B:
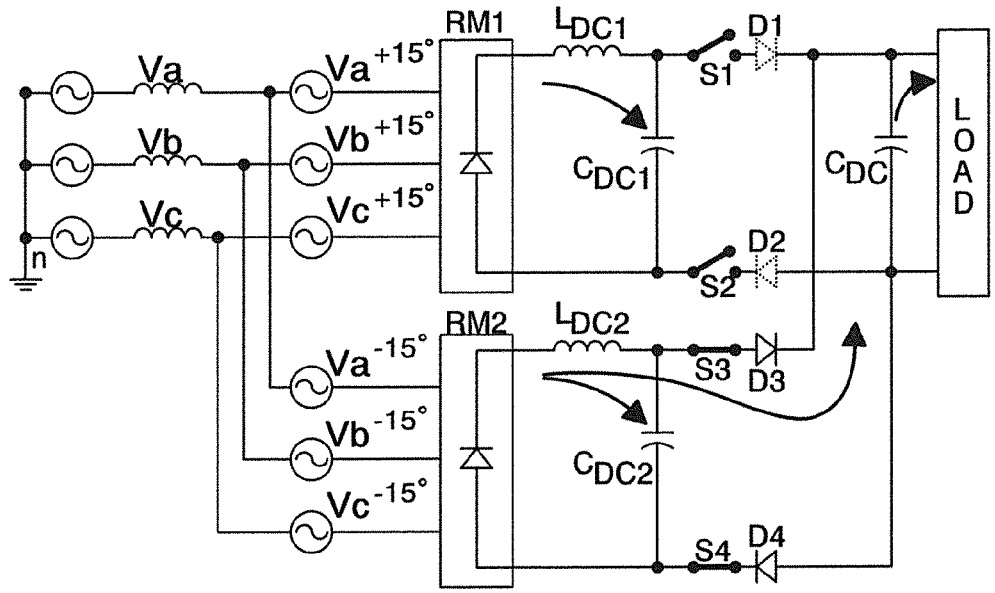

The steady state operating principle is discussed by analyzing each half of the AC/DC converter system 18 when its corresponding switches are ON. The influence of the section that has its switch OFF is also discussed. FIGS. 5A and 5B show the equivalent circuits during operation. The operation is divided into two intervals—intervals 1 and 2.

Interval 1

At start, the voltage across the first DC bus capacitor $C_{DC1}$ is only slightly higher than that across the main DC bus capacitor $C_{DC}$. The start of interval 1 is identified here as the duration during which the switches S1 and S2 are ON. Turning ON of S1 and S2 connects the first DC bus capacitor $C_{DC1}$ to the main DC bus capacitor $C_{DC}$. Since the instantaneous voltage difference between capacitors $C_{DC1}$ and $C_{DC}$ is marginal, the transient current flow from $C_{DC1}$ to $C_{DC}$ is well limited by the on-state resistance of the switch S1, the diode D1, the switch S2, and the diode D2 (FIG. 5A). Soon the voltage across the main DC bus $C_{DC}$ equals that across $C_{DC1}$. Both capacitors start sourcing current into the load. Voltage across $C_{DC1}$ differs from that across $C_{DC}$ by only the forward drop of the switch S1 ($V_{CE(sat)}$), forward drop of the diode D1 ($V_F$), forward drop of the switch S2 ($V_{CE(sat)}$) and forward drop of the diode D2 ($V_F$). Since the instantaneous line-line voltage at the input of the rectifier module RM1 28 goes higher than the voltage across the combination of $C_{DC1}$ and $C_{DC}$, there is flow of current into the load, the inverter 40, via the smoothing DC link choke $L_{DC1}$, the switch S1, the diode D1, the diode D2, and the switch S2.

During interval 1, the switches S3 and S4 remain OFF. In the previous interval, the second DC bus capacitor $C_{DC2}$ had discharged into the load and its voltage is assumed to be lower than the peak value of the line-line voltage across windings $L_{11}$-$L_{22}$ or $L_{22}$-$L_{33}$ or $L_{11}$-$L_{33}$. Since the second DC bus capacitor $C_{DC2}$ is now disconnected from the load, it gets a chance to recover its charge. It thus gets charged to the peak value of the input line-line voltage via the rectifier module RM2 in FIG. 5A. The charging current is smoothed by the DC link choke $L_{DC2}$. In other words, the current through the second set of windings ($L_{11}$-$L_{22}$ or $L_{22}$-$L_{33}$ or $L_{11}$-$L_{33}$) does not really fall off to zero but remains continuous since it now flows to charge up the second DC bus capacitor $C_{DC2}$. The magnitude of this charging current depends on the load condition and can become very low, close to discontinuous conduction, during light-load operation.

Interval 2

Interval 2 is a mirror image of interval 1. At the start of interval 2, the voltage across the second DC bus capacitor $C_{DC2}$ is only slightly higher than that across the main DC bus capacitor $C_{DC}$. The start of interval 2 is identified here as the duration during which the switches S3 and S4 are ON. Turning ON of S3 and S4 connects the second DC bus capacitor $C_{DC2}$ to the main DC bus capacitor $C_{DC}$. Since the instantaneous voltage difference between capacitors $C_{DC2}$ and $C_{DC}$ is marginal, the transient current flow from $C_{DC2}$ to $C_{DC}$ is well limited by the on-state resistance of the switch S3, the diode D3, the switch S4, and the diode D4 (FIG. 5B). Soon the voltage across $C_{DC}$ equals that across $C_{DC2}$. Both capacitors start sourcing current into the load. Voltage across $C_{DC2}$ differs from that across $C_{DC}$ by only the forward drop of the switch S3 ($V_{CE(sat)}$), forward drop of the diode D3 ($V_F$), forward drop of the switch S4 ($V_{CE(sat)}$) and forward drop of the diode D4 ($V_F$). Since the instantaneous line-line voltage at the input of the rectifier module RM2 goes higher than the voltage across the combination of $C_{DC2}$ and $C_{DC}$, there is flow of current into the load via the smoothing DC link choke $L_{DC2}$, the switch S3, the diode D3, the diode D4, and the switch S4.

During interval 2, the switches S1 and S2 remain OFF. In the previous interval, the first DC bus capacitor $C_{DC1}$ had discharged into the load and its voltage is assumed to be lower than the peak value of the line-line voltage across windings $L_1$-$L_2$ or $L_2$-$L_3$ or $L_1$-$L_3$. Since the first DC bus capacitor $C_{DC1}$ is now disconnected from the load, it gets a chance to recover its charge. It thus gets charged to the peak value of the input line-line voltage via rectifier module RM1 in FIG. 5B. The charging current is smoothed by the DC link choke $L_{DC1}$ in FIG. 5B. In other words, the current through the first set of windings ($L_1$-$L_2$ or $L_2$-$L_3$ or $L_1$-$L_3$) does not really fall off to zero but remains continuous since it now flows to charge up the capacitor $C_{DC1}$. The magnitude of this charging current depends on the load condition and can become very low, close to discontinuous conduction, during light-load operation.

Based on the operating principle described above, the following important observations are made. When the switch pair S1-S2 (in interval 1) or S3-S4 (in interval 2) is turned ON, there is a sudden rush of current between capacitor $C_{DC1}$ and $C_{DC}$ (interval 1) or between capacitor $C_{DC2}$ and $C_{DC}$ (interval 2). The sudden rush of current is limited only by the resistances in the switches, diodes, cable connections and by the parasitic inductance in the loop. More important, the peak of the current depends on the instantaneous difference between the voltage across capacitors $C_{DC1}$ and $C_{DC}$ (interval 1) or capacitors $C_{DC2}$ and $C_{DC}$ (interval 2). If the duration for which the switches are ON or OFF is long, this difference in voltage can grow causing high current transient during the respective switch pair operation. To limit this transient, the duration for which a particular pair is connected (or the other pair remains disconnected) to the main DC bus capacitor $C_{DC}$ is reduced to a very low value. The duration for a particular line-line pair to remain in conduction in a 12-pulse system is 30 electrical degrees, corresponding to 1.389 ms. To limit the instantaneous difference in the capacitor voltages with respect to the main DC bus capacitor, the duration of conduction of switches S1-S2 or S3-S4 is restricted to a period of about 1/10th of 1.389 ms, corresponding to an effective switching frequency of 7.2 kHz.

The time during which a switch pair (S1-S2 or S3-S4) remains OFF, the voltage across the switch climbs to the difference between the instantaneous voltage across the incoming line-line voltage and the main DC bus voltage. Since the duration for which the switch is ON or OFF is very short, this difference is quite small. In fact, it has been observed to be a maximum of $0.134 \cdot V_{LL} (\sqrt{2} - \cos(30))$. This corresponds to only about 32V for a 240V system or 64V for a 480V system. Due to parasitic inductance in the circuit, this voltage can go as high as $0.5 \cdot \sqrt{2} \cdot V_{LL}$. Use of bus bar structure and good wiring practice can limit this spike voltage to much lower levels. The theoretical limit shows that low voltage IGBTs are sufficient for this application.

The capacitors $C_{DC1}$ and $C_{DC2}$ are of equal value and they are about 1/3rd or 1/4th of the value of the main DC bus capacitor $C_{DC}$. When the load is an inverter operating an induction motor, then under no-load condition, the magnetizing current circulates between the main DC bus capacitor $C_{DC}$ and the magnetic circuit of the induction motor. Though the switches S1-S2 and S3-S4 are turned ON and OFF, there is no energy transfer between $C_{DC1}$ or $C_{DC2}$ and $C_{DC}$. This is important and shows that switches S1-S2 and S3-S4 need not be bidirectional. However, diodes D1, D2, D3, and D4 perform important task of preventing cross conduction and are required to be part of the proposed circuit.

Switch pairs S1-S2 and S3-S4 are operated at approximately 50% duty cycle so that they share current equally. This optimizes the current rating, which needs to be only 50% of the rated DC bus load current. However, each switch-diode combination needs to carry a repetitive peak current equal to the rated DC bus load current.

Since the voltage across the switches are quite low, there is no need for snubber capacitor to be employed in the circuit. This reduces cost of the proposed circuit.

The disclosed system is inherently fault tolerant. Any mis-operation of the switch pair S1-S2 or S3-S4 puts the system back into a six pulse configuration with no improvement in power factor or reduction in harmonic current. However, there is no catastrophic failure event.

Since the switches are turned on and off at around 7.2 kHz, there is no need to make extra effort to synchronize with the input line-line voltages. The error introduced due to unsynchronized operation is minimal and does not warrant a sophisticated synchronizing circuit, which thereby reduces cost and complexity of the proposed circuit.

There is no need for current monitoring since no effort is made to balance current conduction between the switch pairs. 50% duty assures symmetrical operation. No current sensor makes the proposed circuit simple and inexpensive.

The DC bus voltage is also not sensed since it is not regulated to be at any predefined level.

The circuit shown in FIG. 4 lends itself to soft charging the main DC bus 38 without the need for a soft-charge resistor-contactor arrangement. By controlling the duty cycle of the switch pair S1-S2 and S3-S4 in optimal manner, the main DC bus 35 can be easily soft charged. The basic operation to achieve this is described next.

Figure 6:
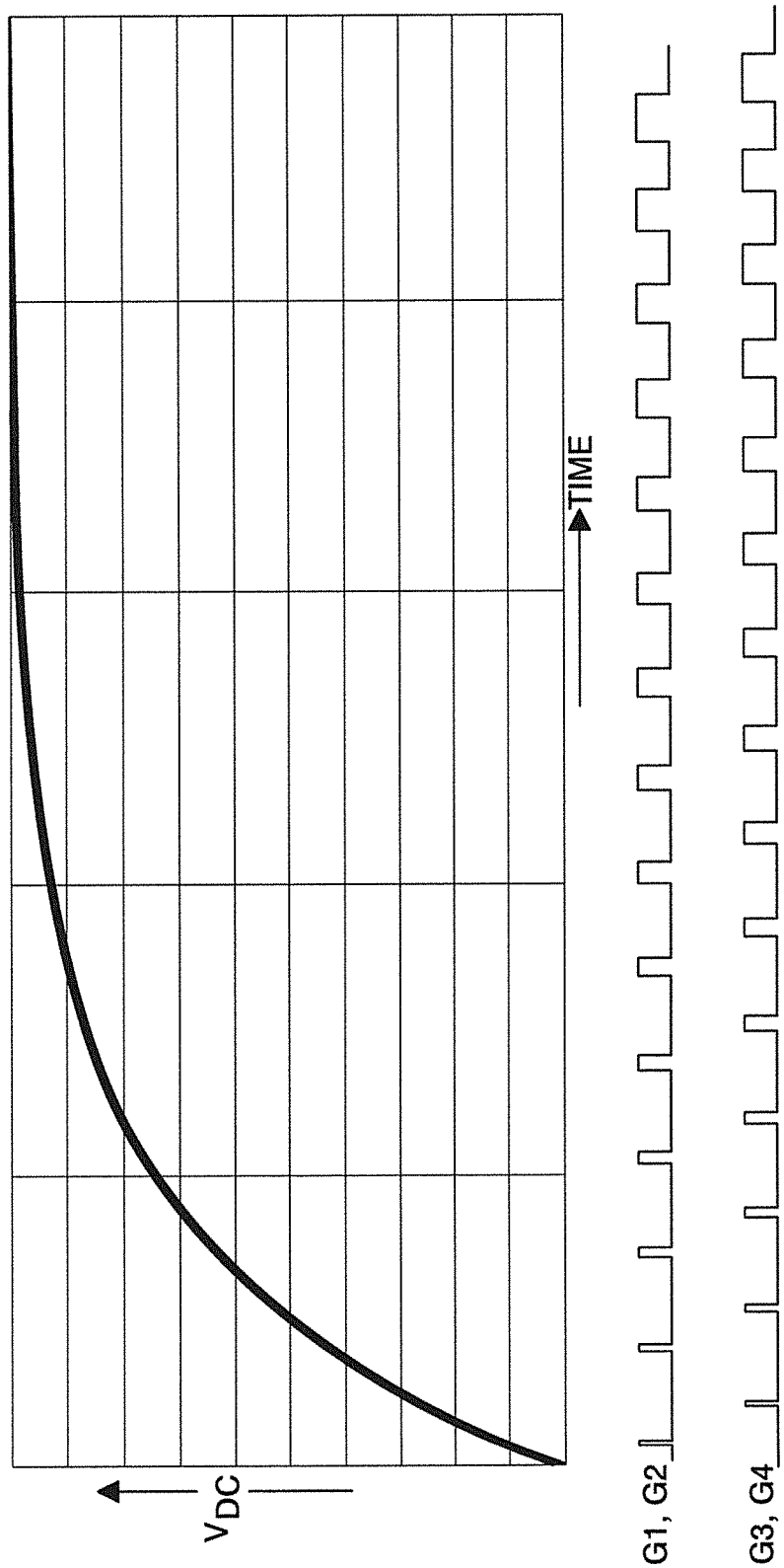
FIG. 6 is a timing diagram illustrating a switching scheme to soft charge a main DC bus capacitor in the circuit of FIG. 4.

Since the capacitors $C_{DC1}$ and $C_{DC2}$ are small compared to the main DC bus capacitor $C_{DC}$, the inrush current into $C_{DC1}$ and $C_{DC2}$ is limited easily by the input inductor (~0.03 pu), the leakage inductance of the autotransformer (typically 0.01 pu) and the DC link inductors $L_{DC1}$ and $L_{DC2}$, respectively. Assuming that the input capacitors $C_{DC1}$ and $C_{DC2}$ are charged to the peak value of the input line-line voltage, switch pairs S1-S2 and S3-S4 are turned ON alternately starting from a very short pulse width. The short pulse width allows transfer of energy alternately from $C_{DC1}$ and then from $C_{DC2}$ to $C_{DC}$ in short duration pulses. Slowly, the pulse duration is increased whereby more and more energy is transferred from $C_{DC1}$ and $C_{DC2}$ to $C_{DC}$ in alternate manner. Eventually, the pulse width is increased to its maximum duty cycle value of 49% by which time the main DC bus capacitor is fully charged to the voltage level of $C_{DC1}$ and $C_{DC2}$. The above description is illustrated in FIG. 6.

From the discussions thus far, important conclusions can be drawn. A key deficiency associated with autotransformer configurations is current sharing. Lack of current sharing causes the autotransformer configuration to work simply as a six-pulse diode rectifier unit. An arrangement as shown in FIG. 4 is needed to make the autotransformer configuration work well.

The current waveform associated with autotransformers is generally associated with high di/dt due to the inherently low inductance of autotransformers. This issue has been resolved in the circuit of FIG. 4 by the use of DC link inductors and input AC reactors having an impedance value in the approximate range of 0.03 pu.

By using a large DC bus capacitor ($C_{DC}$ in FIG. 4), the need for supplying magnetizing current is transferred from auxiliary capacitors $C_{DC1}$ and $C_{DC2}$ to $C_{DC}$. This is an important observation as it eliminates the need for bidirectional switches in S1-S4. The disclosed circuit uses unidirectional switches in S1-S4 in conjunction with diodes D1-D4, respectively.

By switching the switches in the 7.2 kHz range, the error between the voltages across auxiliary capacitors $C_{DC1}$, $C_{DC2}$ and the main capacitor $C_{DC}$ is kept to a minimum. This reduces current transients and stresses in the switches S1-S4 and the diodes D1-D4. Higher operating frequency can yield better results. However, when the power of the system increases, the switching speed cannot be increased beyond a certain practical limit.

The proposed circuit lends itself well to allow soft charging the main DC bus capacitor $C_{DC}$. By controlling the switching pulse width at turn ON, the main DC bus capacitor $C_{DC}$ can be soft charged, thereby eliminating the need for a soft charge resistor and contactor arrangement.

Due to the fact that the switches S1-S4 are used in a series configuration, the voltage stress across the switches is minimal and precludes the need for snubber capacitors across them.

The mis-operation of any of the four switches S1-S4, reverts the circuit to six-pulse operation without any catastrophic failure. This feature allows operation of the unit in a safe manner for a short duration by which time corrective actions can be taken to remedy the problem.

Input current harmonic distortion values of less than 5% at 90% and higher load condition have been achieved using the disclosed circuit. Since the scheme does not regulate the DC bus, the main DC bus is seen to drop from light load to rated load by 3% to 5% of nominal value, depending on the value of the input inductor employed.

Thus, as described above, an AC/DC converter system uses an autotransformer providing phase shifted AC supplies to drive first and second DC buses which are alternately connected to a main DC bus to provide electrical isolation.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An AC/DC converter system comprising:
an input circuit for connection to a three phase AC source;
an autotransformer coupled to the input circuit for developing first and second phase shifted AC supplies;
a first AC/DC converter having a first rectifier connected to the first phase shifted AC supply converting AC power to DC power across a first DC bus having a first DC bus capacitor;
a second AC/DC converter having a second rectifier connected to the second phase shifted AC supply converting AC power to DC power across a second DC bus having a second DC bus capacitor; and
a first and second set of switches connected between the respective first and second DC busses and a main DC bus having a main DC bus capacitor, wherein the first and second sets of switches are controlled so that only one of the first and the second DC busses is connected to the main DC bus to charge the main DC bus capacitor.

2. The AC/DC converter system of claim 1 wherein the first and second sets of switches are controlled by a ramp up pulse generator.

3. The AC/DC converter system of claim 2 wherein the ramp up pulse generator has a duty cycle less than 50%.

4. The AC/DC converter system of claim 1 wherein the first and second sets of switches each comprises two pairs of a switch diode combination for the plus and minus side of the respective first and second DC bus.

5. The AC/DC converter system of claim 1 wherein the first and second sets of switches are switched at about 7.2 kHz with equal duty cycle.

6. The AC/DC converter system of claim 5 wherein the duty cycle is about 50%.

7. An AC/DC converter system comprising:
an input circuit for connection to a three phase AC source;
an autotransformer coupled to the input circuit for developing first and second phase shifted AC supplies;
a first AC/DC converter having a first rectifier connected to the first phase shifted AC supply converting AC power to DC power across a first DC bus having a first DC bus capacitor;
a second AC/DC converter having a second rectifier connected to the second phase shifted AC supply converting AC power to DC power across a second DC bus having a second DC bus capacitor; and
a control circuit connected between the first and second DC busses and a main DC bus having a main DC bus capacitor, to alternately charge the main DC bus capacitor from the two phase shifted AC supplies, the rectified outputs of which are electrically isolated from one another.

8. The AC/DC converter system of claim 7 wherein the first and second sets of switches are controlled so that only one of the first and the second DC busses is connected to the main DC bus to charge the main DC bus capacitor.

9. The AC/DC converter system of claim 7 wherein the first and second set of switches are controlled by a ramp up pulse generator.

10. The AC/DC converter system of claim 9 wherein the ramp up pulse generator has a duty cycle less than 50%.

11. The AC/DC converter system of claim 7 wherein the first and second set of switches each comprises two pairs of a switch diode combination for the plus and minus side of the respective first and second DC bus.

12. The AC/DC converter system of claim 7 wherein the first and second set of switches are switched at about 7.2 kHz with equal duty cycle.

13. The AC/DC converter system of claim 12 wherein the duty cycle is about 50%.

14. A variable frequency drive system comprising:
an input circuit for connection to a three phase AC source;
an autotransformer coupled to the input circuit for developing first and second phase shifted AC supplies;
a first AC/DC converter having a first rectifier connected to the first phase shifted AC supply converting AC power to DC power across a first DC bus having a first DC bus capacitor;
a second AC/DC converter having a second rectifier connected to the second phase shifted AC supply converting AC power to DC power across a second DC bus having a second DC bus capacitor;
a control circuit connected between the first and second DC busses and an inverter DC bus having an inverter DC bus capacitor, to alternately charge the inverter DC bus capacitor from the two phase shifted AC supplies, the rectified outputs of which are electrically isolated from one another; and
an inverter coupled to the inverter DC bus to convert DC power to AC power.

15. The variable frequency drive system of claim 14 wherein the first and second sets of switches are controlled so that only one of the first and the second DC busses is connected to the main DC bus to charge the main DC bus capacitor.

16. The variable frequency drive system of claim 14 wherein the first and second set of switches are controlled by a ramp up pulse generator.

17. The variable frequency drive system of claim 16 wherein the ramp up pulse generator has a duty cycle less than 50%.

18. The variable frequency drive system of claim 14 wherein the first and second set of switches each comprises two pairs of a switch diode combination for the plus and minus side of the respective first and second DC bus.

19. The variable frequency drive system of claim 14 wherein the first and second set of switches are switched at about 7.2 kHz with equal duty cycle.

20. The variable frequency drive system of claim 19 wherein the duty cycle is about 50%.

* * * * *